(12) United States Patent
Tominaga et al.

(10) Patent No.: US 7,686,137 B2
(45) Date of Patent: Mar. 30, 2010

(54) OIL SEPARATING STRUCTURE OF AUTOMATIC TRANSMISSION

(75) Inventors: Masakazu Tominaga, Fuji (JP); Tsutomu Saitou, Fuji (JP); Hiromi Taguchi, Fuji (JP); Yasuhiko Kunii, Fuji (JP)

(73) Assignee: JATCO Ltd (JP)

( * ) Notice: Subject to any disclaimer, the term of this patent is extended or adjusted under 35 U.S.C. 154(b) by 1193 days.

(21) Appl. No.: 11/231,301

(22) Filed: Sep. 20, 2005

(65) Prior Publication Data

US 2006/0065487 A1    Mar. 30, 2006

(30) Foreign Application Priority Data

Sep. 21, 2004    (JP) .............................. 2004-273080

(51) Int. Cl.
F16H 57/04 (2006.01)
F01M 1/12 (2006.01)
F01M 9/06 (2006.01)

(52) U.S. Cl. .................... 184/6.12; 184/11.3; 184/6.13; 74/606 R

(58) Field of Classification Search ................ 184/6.12, 184/106, 11.1, 11.3, 6.28, 6.13; 475/230, 475/248, 159; 74/467, 606 R, 607, 468, 74/473, 37
See application file for complete search history.

(56) References Cited

U.S. PATENT DOCUMENTS

| | | | |
|---|---|---|---|
| 2,292,086 A | 8/1942 | Pritchard | |
| 2,645,305 A | 7/1953 | Roos | |
| 3,625,310 A | 12/1971 | Herrick | |
| 4,231,266 A | 11/1980 | Nishikawa et al. | |
| 4,378,711 A | 4/1983 | Daniel | |
| 4,414,861 A | 11/1983 | Witt | |
| 4,693,133 A | 9/1987 | Tomita et al. | |
| 4,914,968 A | 4/1990 | Diermeier et al. | |
| 5,048,370 A | 9/1991 | Duello | |
| 5,404,963 A | 4/1995 | Crepas et al. | |

(Continued)

FOREIGN PATENT DOCUMENTS

DE    3819519 A1    12/1989

(Continued)

OTHER PUBLICATIONS

Extended European search report issued for EP patent application No. 05255797.2-1254 mailed Nov. 7, 2007. 7 pages.

(Continued)

Primary Examiner—Bradley T King
Assistant Examiner—Thomas W Irvin
(74) Attorney, Agent, or Firm—Rossi, Kimms & McDowell LLP

(57) ABSTRACT

There is provided an oil separating structure of an automatic transmission, which makes it difficult for an oil strainer of an oil pump to draw oil containing air bubbles. A baffle plate base separates a space around the oil strainer and a space around a driven sprocket as well as a final gear, and therefore, oil containing air bubbles formed as a result of agitation by the driven sprocket, chain, and final gear does not flow directly into the oil strainer. As a result, the oil strainer is unlikely to draw oil containing air bubbles.

5 Claims, 10 Drawing Sheets

U.S. PATENT DOCUMENTS

| | | | |
|---|---|---|---|
| 5,505,112 A | 4/1996 | Gee | |
| 5,511,448 A | 4/1996 | Kameda et al. | |
| 5,522,476 A | 6/1996 | Holman | |
| 5,667,036 A | 9/1997 | Mueller et al. | |
| 5,676,221 A | 10/1997 | Renk et al. | |
| 5,768,954 A | 6/1998 | Grabherr et al. | |
| 5,791,311 A | 8/1998 | Ozeki | |
| 5,910,062 A | 6/1999 | Mizuta | |
| 6,189,412 B1 | 2/2001 | Tsubata et al. | |
| 6,238,312 B1 | 5/2001 | Tsubata et al. | |
| 6,299,561 B1 | 10/2001 | Kramer et al. | |
| 6,616,432 B2 * | 9/2003 | Szczepanski et al. | 418/126 |
| 7,343,833 B2 | 3/2008 | Matsushima | |
| 7,421,921 B2 | 9/2008 | Kimura et al. | |
| 2006/0048600 A1 | 3/2006 | Taguchi et al. | |
| 2006/0060424 A1 | 3/2006 | Tominaga et al. | |

FOREIGN PATENT DOCUMENTS

| | | |
|---|---|---|
| DE | 19731746 A1 | 2/1998 |
| EP | 0974775 A2 | 1/2000 |
| EP | 0985853 A2 | 3/2000 |
| EP | 0985853 A3 | 10/2002 |
| GB | 458379 A | 12/1936 |
| GB | 774221 A | 5/1957 |
| GB | 1426352 A | 2/1976 |
| GB | 2006348 A | 5/1979 |
| JP | 54-79374 U | 11/1977 |
| JP | 1-67374 U | 4/1989 |
| JP | 05-010856 A | 1/1993 |
| JP | 5-10856 U | 2/1993 |
| JP | 9-72209 A | 3/1997 |
| JP | 11-098616 A | 4/1999 |
| JP | 2000-146155 A | 2/2000 |
| JP | 2001-221326 A | 8/2001 |
| JP | 2001221326 A | 8/2001 |
| JP | 2002-70993 A | 3/2002 |
| JP | 2003-130188 A | 5/2003 |
| JP | 2003-156127 A | 5/2003 |

OTHER PUBLICATIONS

Extended search report issued in corresponding European application No. 05255798.0-1254, dated Jan. 31, 2008.

Notice of Reason for Refusal issued in corresponding Japanese Patent Application No. 2004-273080 dated Jan. 13, 2009.

* cited by examiner

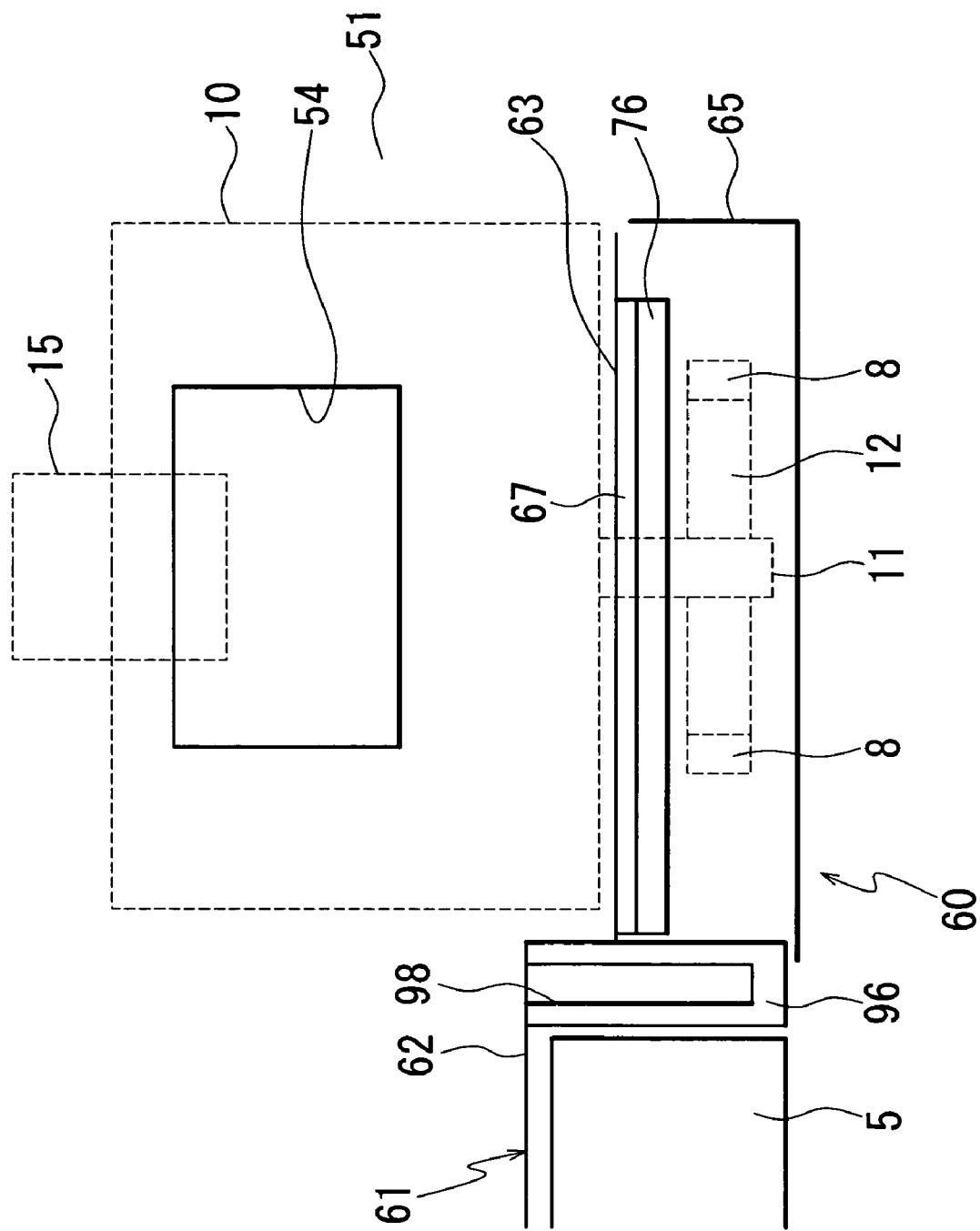

OIL SEPARATING STRUCTURE OF AUTOMATIC TRANSMISSION

BACKGROUND OF THE INVENTION

1. Field of the Invention

The present invention relates to an oil separating structure for separating oil around rotating bodies in an automatic transmission.

2. Description of the Related Art

There has been an automatic transmission in which an oil pump is disposed apart from an input shaft, so that rotational driving force from the input shaft is transmitted to a driven sprocket of the oil pump via a chain to drive the oil pump.

An example of this automatic transmission has been disclosed in Japanese Laid-Open Patent Publication (Kokai) No. 2003-156127.

In this automatic transmission, an oil pump is installed in an upper part of a shift mechanism that converts engine revolutions, and driving force from an input shaft is transmitted to the oil pump via a chain.

In this automatic transmission, however, if the oil pump is disposed within oil in the lower part of a transmission case, the oil is agitated by rotation of the chain, which drives the oil pump and sprockets of the oil pump, to produce air bubbles in the oil. The oil pump draws the oil containing the air bubbles through an oil strainer.

SUMMARY OF THE INVENTION

It is therefore an object of the present invention to provide an oil separating structure of an automatic transmission, which makes it difficult for an oil strainer of an oil pump to draw oil containing air bubbles.

To attain the above object, there is provided an oil separating structure of an automatic transmission, which comprises a first baffle plate comprising: a chain cover section disposed between a driven sprocket of an oil pump, at least part of which is disposed within oil, and an oil strainer, for separating a space around the driven sprocket and a space around the oil strainer; and a final gear cover section connected to the chain cover section and disposed between a final gear at least part of which is disposed within oil and the oil strainer, for separating a space around the final gear and the space around the oil strainer.

According to the present invention, the first baffle plate is provided between the driven sprocket as well as the final gear and the oil strainer, oil containing air bubbles produced as a result of agitation by the driven sprocket and the final gear can be prevented from flowing directly into the oil strainer. Therefore, the oil strainer is unlikely to draw oil containing air bubbles.

Other features and advantages of the present invention will apparent from the following detailed description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram schematically showing the arrangement of the baffle plate.

DETAILED DESCRIPTION OF THE PREFERRED EMBODIMENTS

The present invention will now be described in detail in accordance with the accompanying drawings showing a preferred embodiment thereof.

Figure 1:
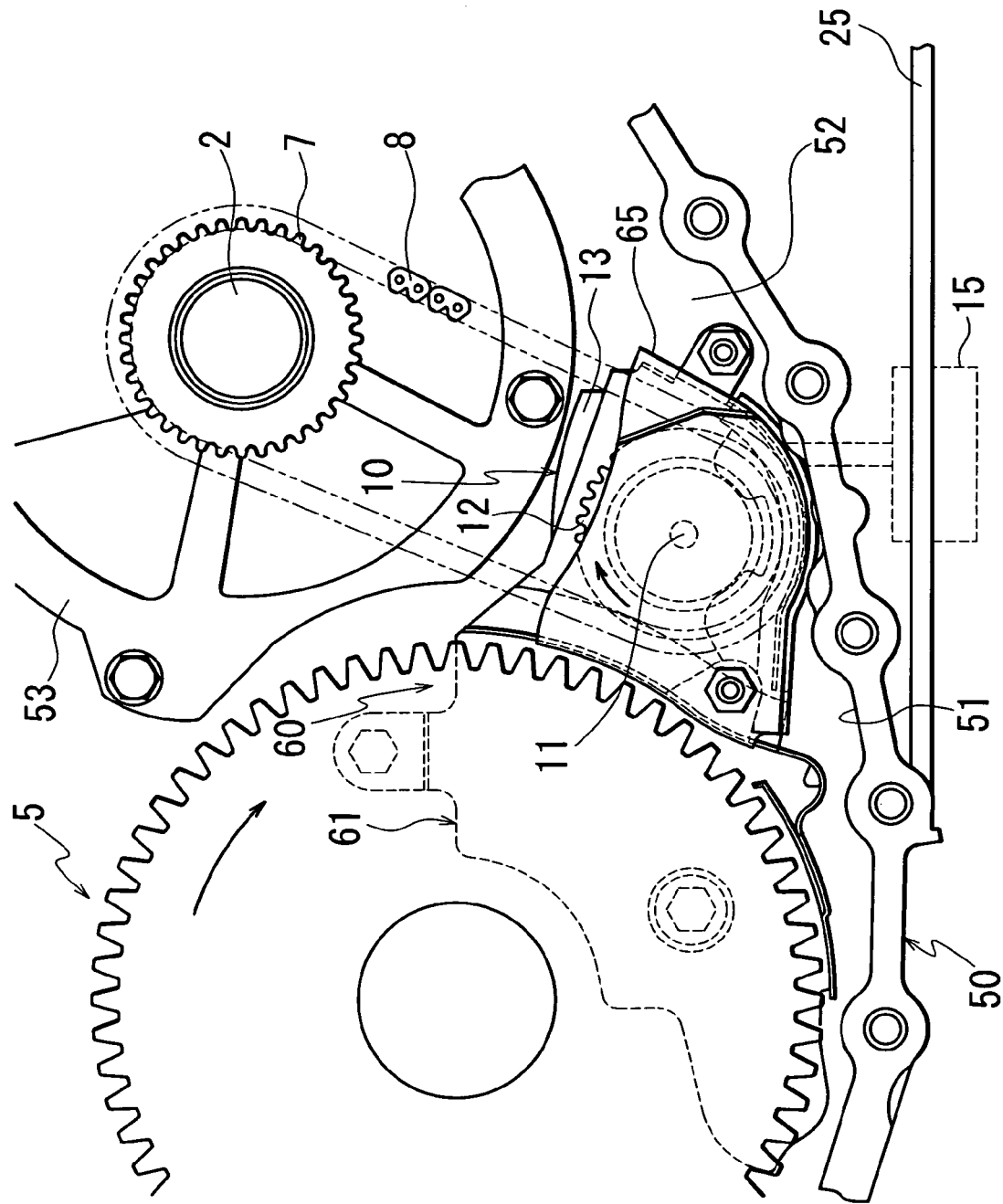
FIG. 1 is a front view showing an oil separating structure of an automatic transmission according to an embodiment of the present invention.

FIG. 1 is a front view showing an oil separating structure of an automatic transmission according to an embodiment of the present invention.

Power from an engine, not shown, is transmitted to an input shaft (hereinafter referred to as a primary shaft) 2 of an automatic transmission through a torque converter, not shown.

The power input to the primary shaft 2 is transmitted to a reduction gear, not shown, after engine revolutions are converted by a shift mechanism, not shown, comprised of a primary pulley provided on the primary shaft 2, a secondary pulley provided on a secondary shaft, and a V belt wound over the primary pulley and the secondary pulley. The reduction gear is engaged with a final gear 5 of a differential, so that power is transmitted from the reduction gear to the differential.

The power transmitted to the differential is transmitted to driving wheels of a vehicle, not shown, to drive the vehicle.

An oil pan mounting section 25 is provided in a lower part of a transmission case 50, and an oil pan, not shown, is mounted on the oil pan mounting section 25.

An oil pump 10, which is driven by torque from the primary shaft 2, is disposed such that an oil pump rotary shaft 11 and the primary shaft 2 are arranged in parallel with each other. The oil pump 10 is disposed in the vicinity of a case bottom wall 51 at the bottom of the transmission case 50 so as to draw oil stored in an oil pan, which is attached to a lower part of the transmission case 50, through an oil strainer.

The back of a pump main body 13 of the oil pump 10 as viewed in FIG. 1 is attached to a supporting wall 52 extended vertically from the case bottom wall 51 of the transmission case 50.

A driven sprocket 12 is attached to an end of the oil pump rotary shaft 11 on the front side as viewed in FIG. 1.

The rotating surfaces of the driven sprocket 12 and the final gear 5 are substantially in plane with each other.

A cover 53 that supports the primary shaft 2 is attached to the supporting wall 52. A torque converter, not shown, supported by the primary shaft 2 is disposed in front of the cover 53 as viewed in FIG. 1. The primary pulley supported by the primary shaft 2 is disposed at the back of the cover 53 as viewed in FIG. 1.

A drive sprocket 7 is attached to a pump impeller of the torque converter. A chain 8 is extended over the drive sprocket 7 and the driven sprocket 12 attached to the oil pump rotary shaft 11 to drive the oil pump 10.

It should be noted that in the case bottom wall 51, a case hole is formed just below the oil pump 10, so that oil in the transmission case 50 flows into the oil pan attached to the lower part of the transmission case 50 through the case hole.

The oil pump 10 is connected to the oil strainer through an oil passage passing through the case hole formed in the case bottom wall 51.

It should be noted that the oil pump 10 is disposed within oil stored in the transmission case 50.

A baffle plate base section 61 that encloses part of the side of the final gear 5 and the side of the driven sprocket 12 extends between the gap between the final gear 5 and the supporting wall 52 and the gap between the pump main body 13 and the driven sprocket 12.

A baffle plate cover section 65 that encloses all of the side of the driven sprocket 12 is disposed in front of the driven sprocket 12 as viewed in FIG. 1.

The baffle plate base section 61 and the baffle plate cover section 65 constitute a baffle plate 60, which encloses both sides of a rotating surface of the driven sprocket 12.

Since the baffle plate 60 encloses the final gear 5 and the driven sprocket 12, the amount of oil agitated when the final gear 5, driven sprocket 12, and chain 8 rotate can be reduced.

It should be noted that the final gear 5 and the driven sprocket 12 rotate in a direction indicated by arrows in FIG. 1.

A detailed description will now be given of the baffle plate base section 61 and the baffle plate cover section 65, which constitute the baffle plate 60.

Figure 2A:
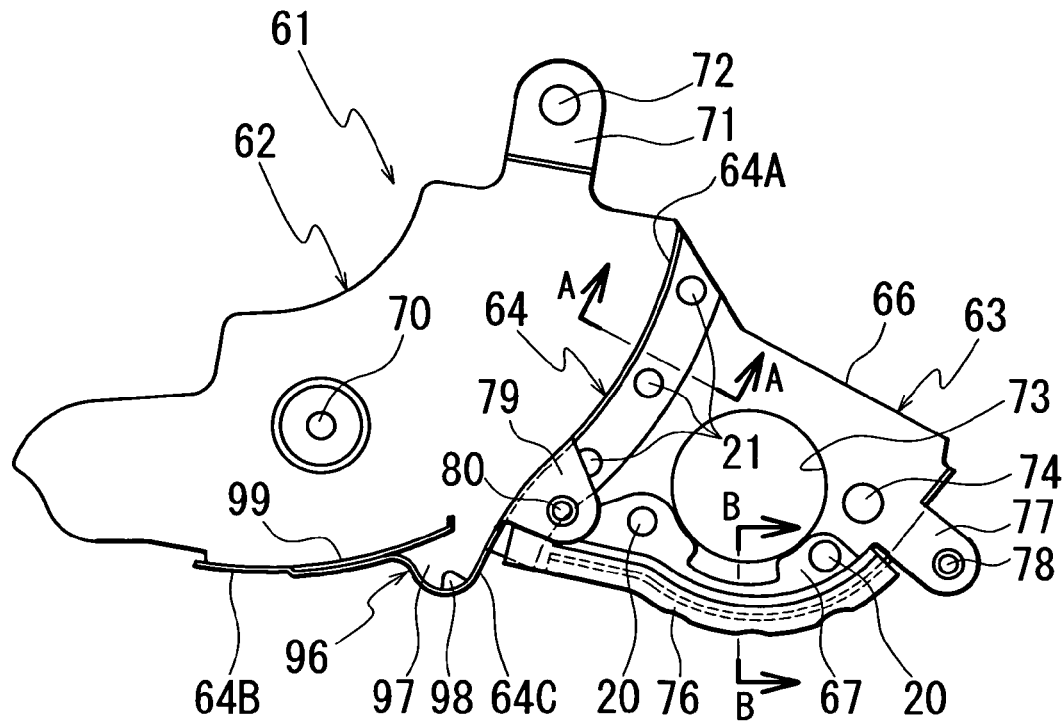
FIG. 2A is a front view showing a baffle plate base.
Figure 2B:
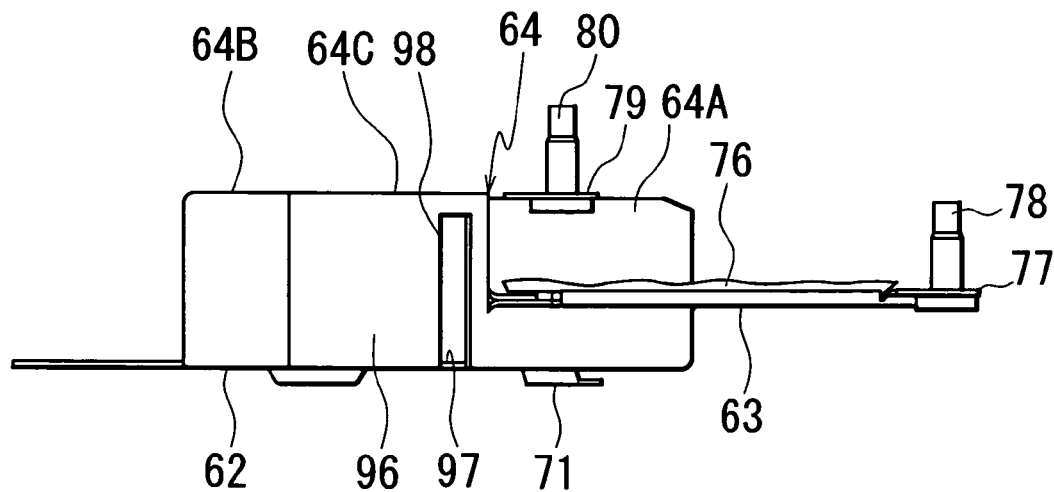
FIG. 2B is a bottom view showing the baffle plate base.
Figure 3:
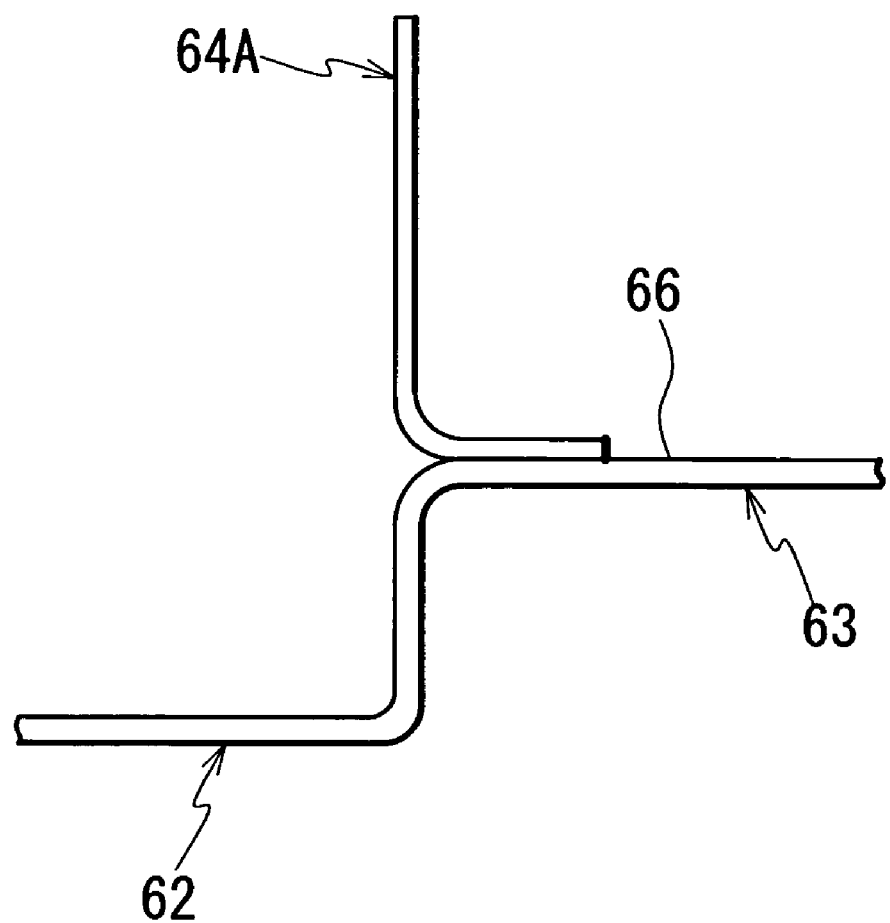
FIG. 3 is a sectional view taken along line A-A of FIG. 2.
Figure 4:
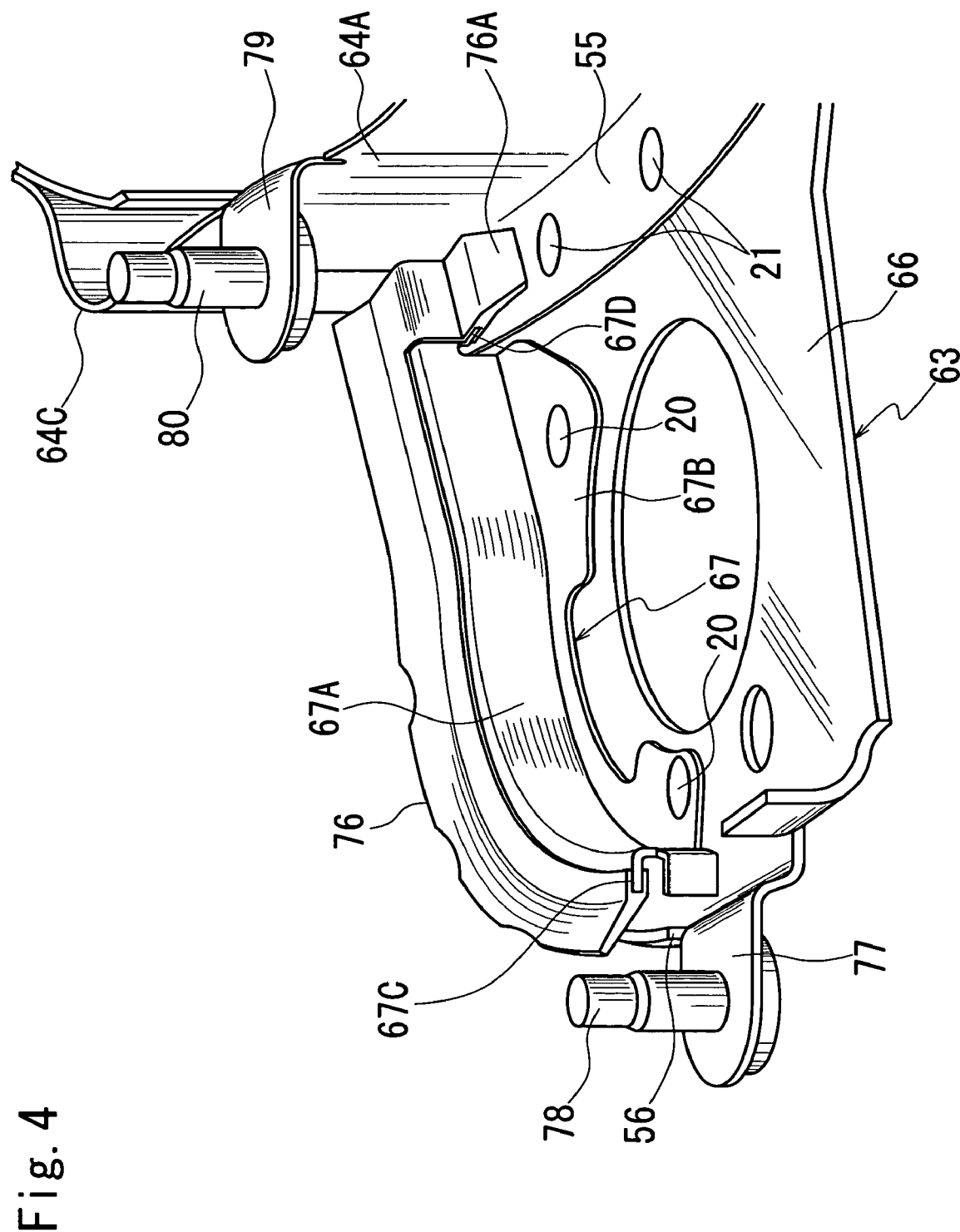
FIG. 4 is a perspective view showing essential parts of the baffle plate base.

FIG. 2A is a front view showing the baffle plate base section 61, and FIG. 2B is a bottom view showing the baffle plate base section 61. FIG. 3 is a sectional view taken along line A-A of FIG. 2A, and FIG. 4 is a perspective view showing essential parts of the baffle plate base section 61.

The baffle plate base section 61 is comprised of a final gear cover section 62 which encloses part of the side of the final gear 5 and a chain cover section 63 which encloses one side of the driven sprocket 12.

The final gear cover section 62 and the chain cover section 63 are configured as an integral body made of one plate member, and their surfaces are offset relative to each other as shown in FIG. 3.

The final gear cover section 62 is formed like a fan which encloses about one-fourth of one side (surface parallel with the rotating surface of the final gear 5) of the final gear 5, which is closer to the oil pump 10.

At a part of the fan-like outer diameter edge of the final gear cover section 62 which is not connected to the chain cover section 63, an oil storage chamber side wall 97 is protruded from the final gear cover section 62 in the direction of the fan-like outer diameter.

The part of the fan-like outer diameter edge of the final gear cover section 62 which is not connected to the chain cover section 63 and the outer diameter edge of the storage chamber side wall 97 are raised toward the front side as viewed in FIG. 2A to form a separation wall member 64B and an oil storage chamber bottom wall 64C, respectively.

Along the fan-like outer diameter edge of the final gear cover section 62, an oil introducing plate 99 is disposed on a boundary between the final gear cover section 62 and the oil storage chamber side wall 97 and welded to the oil storage chamber bottom wall 64C.

The oil introducing plate 99 is disposed in a lower part of the boundary between the final gear cover section 62 and the oil storage chamber side wall 97 as viewed in FIG. 2A.

An oil storage chamber 96 is formed by the oil storage chamber side wall 97, oil storage chamber bottom wall 64C, and oil introducing plate 99.

In a lower part of the oil storage chamber 96 as viewed in FIG. 2A, an oil discharge hole 98 is formed between the oil storage chamber bottom wall 64C and the oil storage chamber side wall 97.

At a part of the fan-like outer diameter edge of the final gear cover section 62 which is connected to the chain cover section 63, an L-shaped cross-section separation wall member 64A curved along the fan-like outer diameter edge is welded to the chain cover section 63 at a welding point 21.

The separation wall 64 is comprised of the separation wall members 64A and 64B and the oil storage chamber bottom wall 64C and partitions the baffle plate base section 61 into the final gear 5 side and the driven sprocket 12 side.

A bolt hole 70 for fixing the baffle plate base section 61 to the supporting wall 52 by a bolt is formed in the final gear cover section 62, and a bolt hole 72 is formed in a protruded section 71 extending upward from the final gear cover section 62 as viewed in FIG. 2A.

A shaft hole 73 for inserting the oil pump rotary shaft 11 is formed in a plate main body 66 of the chain cover section 63.

A bolt hole 74 for fixing the chain cover section 63 to the pump main body 13 is formed on the right side of the shaft hole 73 as viewed in FIG. 2A.

A bottom wall plate 67 to which a rubber plate 76 is attached is welded to the case bottom wall 51 side of the plate main body 66 of the chain cover section 63 at a welding point 20 (the lower side as viewed in FIG. 2A).

As shown in FIG. 4, the bottom wall plate 67 is comprised of a bottom wall section 67A extending vertically from the plate main body 66, a welded section 67B extending from a side edge of the bottom wall section 67A on the plate main body 66 side and welded to the plate main body 66, and a rubber attaching section 67C formed by bending an edge on opposite side of the plate main body 66 with respect to the bottom wall section 67A in a direction opposite to the direction in which the welded section 67B extends.

The rubber plate 76 extending downward as viewed in FIG. 2A is attached to the rubber attaching section 67C by vulcanization.

It should be noted that an edge of the rubber plate 76 on the case bottom wall 51 side is formed with cutouts so that it can conform to the shape of the inner peripheral surface of the case bottom wall 51.

Figure 5:
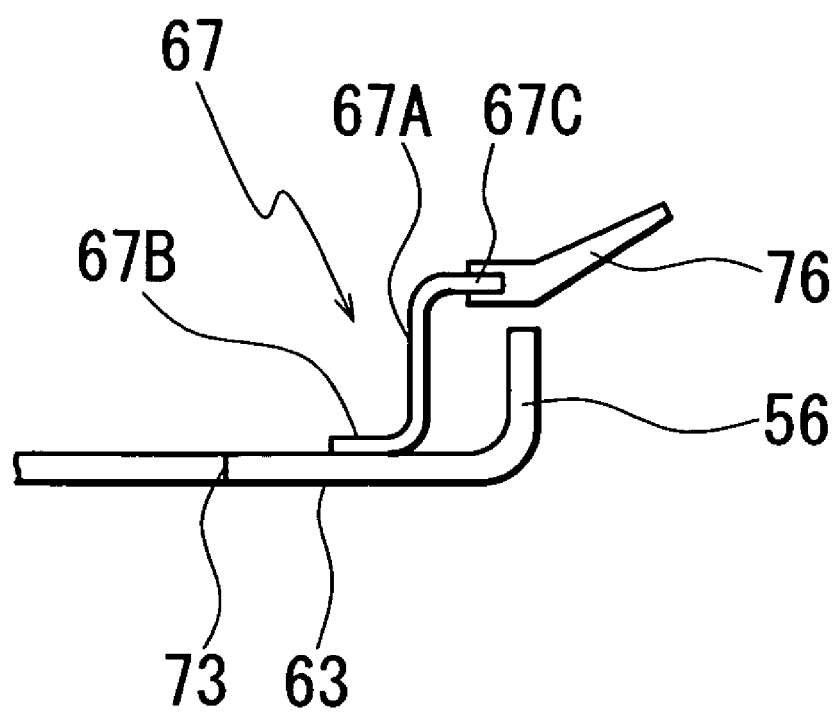
FIG. 5 is a sectional view taken along line B-B of FIG. 2.

FIG. 5 is a sectional view taken along line B-B of FIG. 2A.

As shown in FIG. 5, the rubber plate 76 is inclined so that a side edge thereof on the case bottom wall 51 side can be located above the junction of the rubber plate 76 and the rubber attaching section 67C as viewed in FIG. 5.

Figure 6:
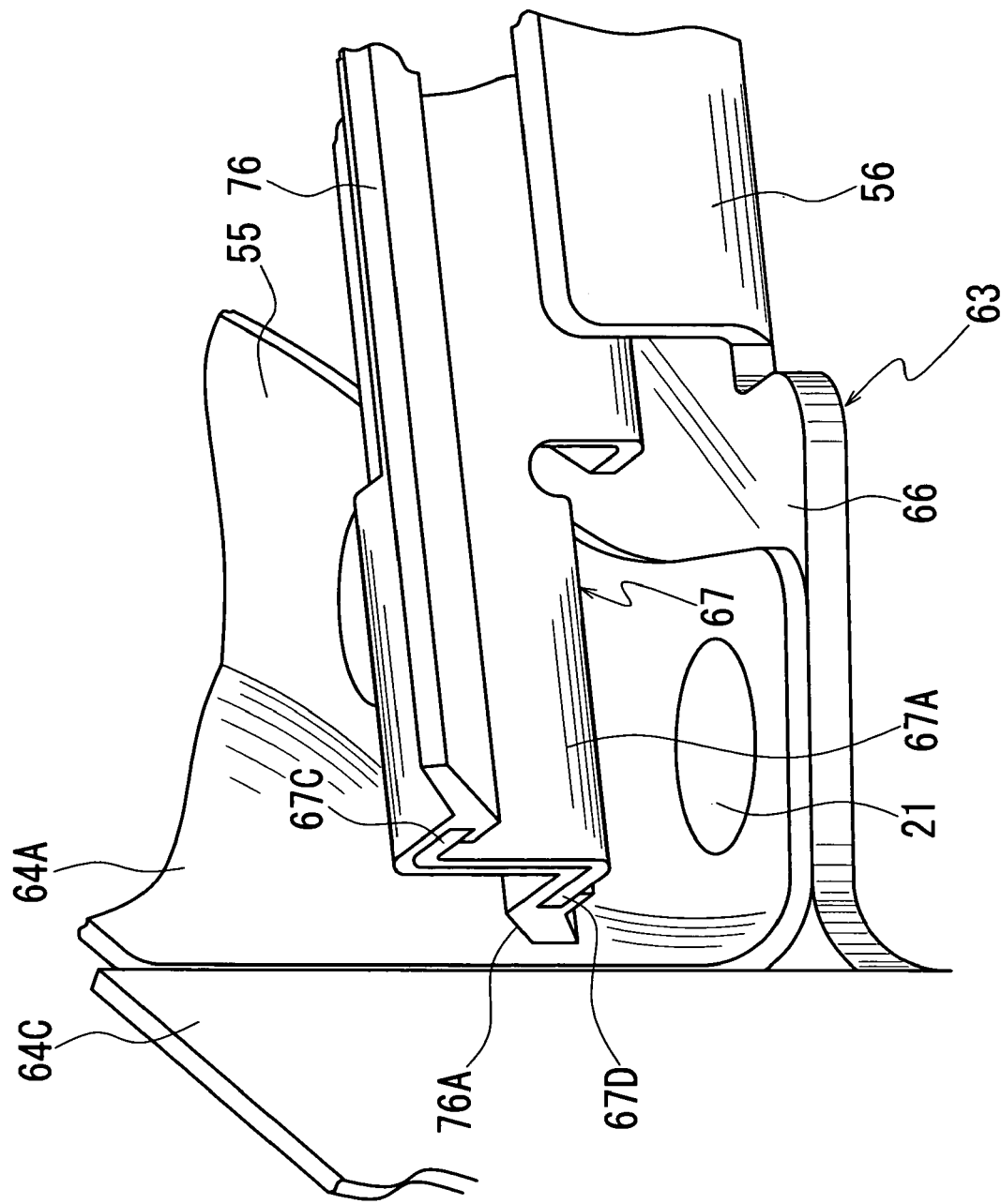
FIG. 6 is an enlarged view showing a side end of a separation wall of a bottom plate.

FIG. 6 is an enlarged view showing an end of the bottom wall plate 67 on the separation wall 64 side as viewed from the case bottom wall 51 side.

As shown in FIGS. 4 and 6, the separation wall member 64A is provided with a welding section 55 so that it can be welded to the plate main body 66.

A inside rubber plate attaching section 67D is formed by bending the separation wall 64 side end of the bottom wall section 67A. Therefore, the bottom wall section 67A does not touch the welding section 55.

An opening sealing section 76A extending from the rubber plate 76 to the welding section 55 along an upper surface of the bottom wall 67 in FIG. 3 is attached to the inside rubber plate attaching section 67D.

An end of the opening sealing section 76A on the welding section 55 side is in contact with the welding section 55.

At an end of the separation wall member 64A on the oil storage chamber bottom wall 64C side, a cover attaching protruded section 79 extends from an edge on the front side as viewed in FIG. 2A toward the chain cover section 63.

A bolt 80 extending upward as viewed in FIG. 2B is attached to the cover attaching protruded section 79.

A cover mounting protruded section 77 extends from the right end of the chain cover section 63 as viewed in FIG. 2A. A bolt 78 extending upward as viewed in FIG. 2B is attached to the cover attaching protruded section 77.

The baffle plate cover section 65 is attached to the baffle plate base section 61 via the bolts 78 and 80.

It should be noted that an end of the plate main body 66 on the case bottom wall 51 side is bent with a gap provided with respect to the bottom wall 67A as shown in FIGS. 4 and 5 in particular to form a reinforcing flange 56.

Figure 7A:
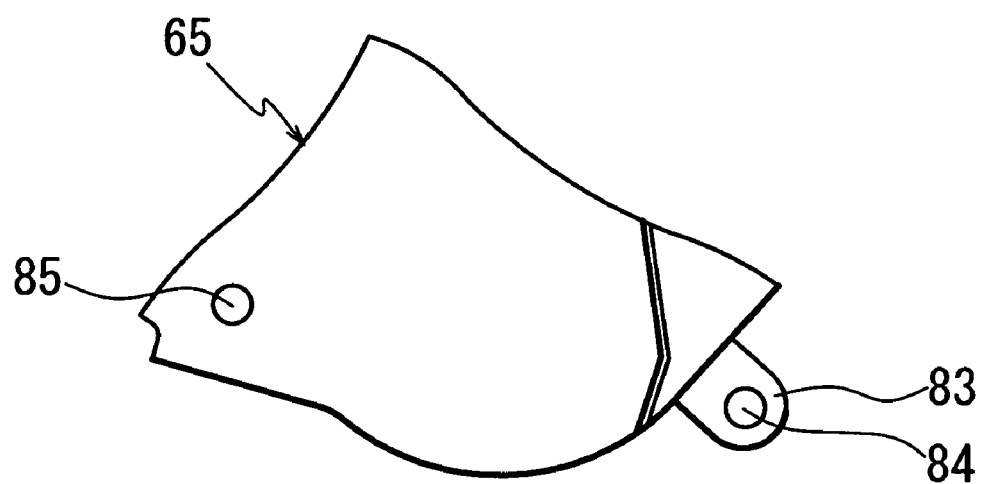
FIG. 7A is a front view showing a baffle plate cover.
Figure 7B:
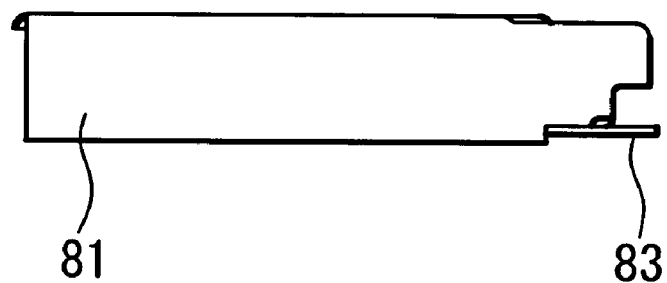
FIG. 7B is a bottom view showing the baffle plate cover.

FIG. 7A is a front view showing the baffle plate cover section 65, and FIG. 7B is a bottom view showing the baffle plate cover section 65.

On a side of the baffle plate cover section 65 in proximity to the case bottom wall 51 (the lower side as viewed in FIG. 7A), a cover bottom wall 81 is formed by bending it toward the baffle plate base section 61 (toward the back as viewed in FIG. 7A).

A cover protruded section 83 extends rightward from the rear edge of the cover bottom wall 81 as viewed in FIG. 7A.

A mounting hole 84 into which the bolt 78 of the baffle plate base section 61 is to be inserted is formed in the cover protruded section 83.

A mounting hole 85 into which the bolt 80 of the baffle plate base section 61 is to be inserted is formed on the left side of the baffle plate cover section 65 as viewed in FIG. 7A.

Figure 8:
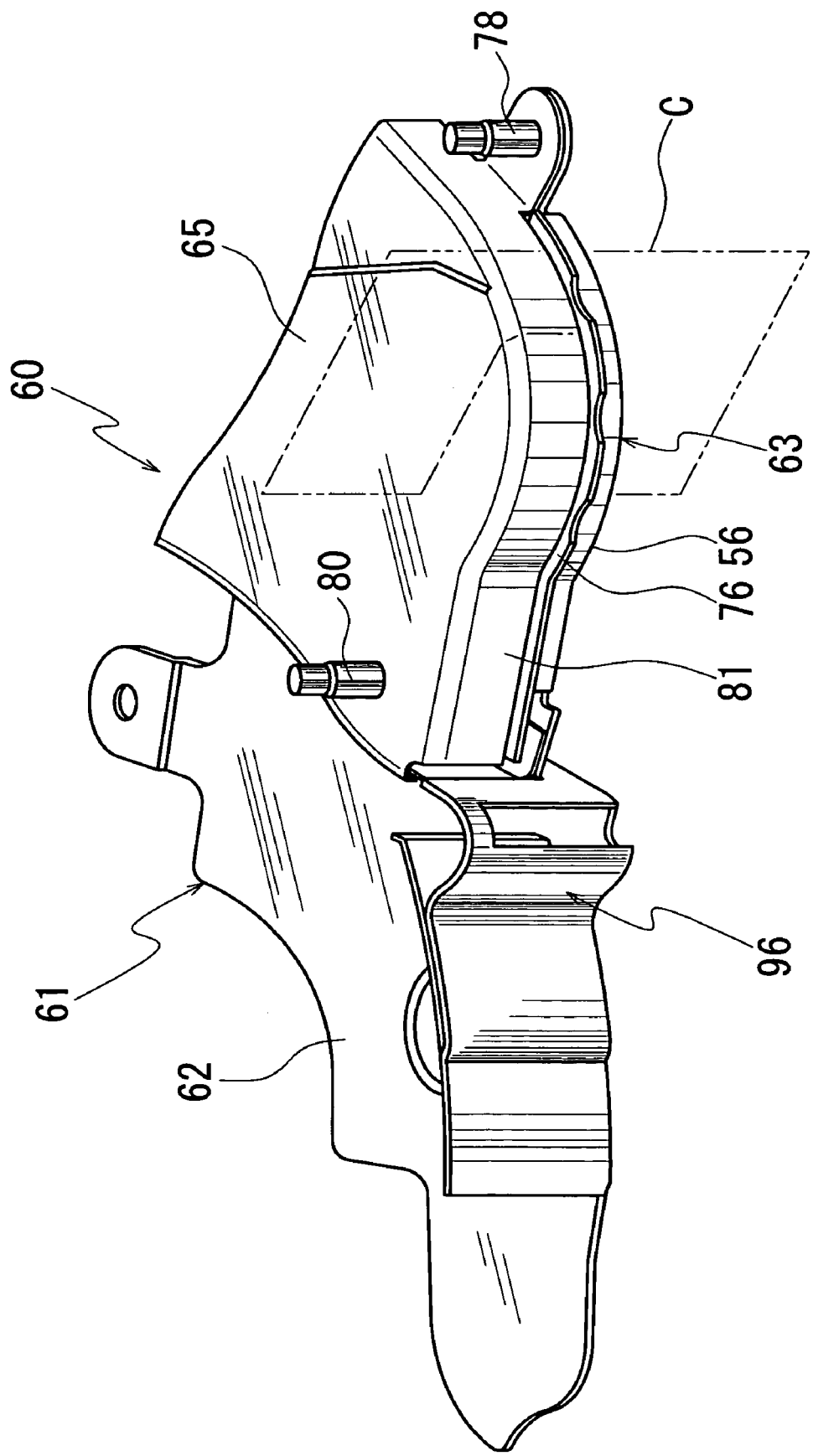
FIG. 8 is a perspective view showing a baffle plate.
Figure 9:
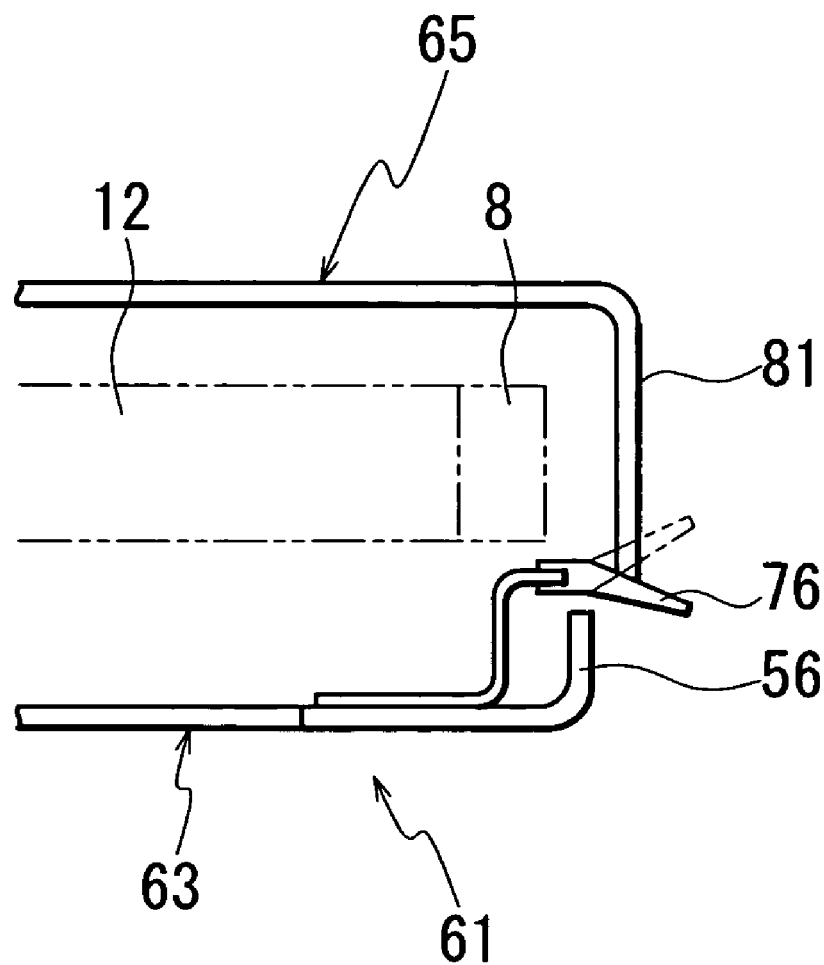
FIG. 9 is a sectional view cut by a plane C of FIG. 8.

FIG. 8 is a perspective view showing the baffle plate base section 61 to which the baffle plate cover section 65 is attached. FIG. 9 is a sectional view cut by a plane C in FIG. 8.

Placing the baffler plate cover section 65 over the baffle plate base section 61 covers the separation wall member 64A and the chain cover section 63.

When the baffle plate cover section 65 is placed over the baffle plate base section 61, the cover bottom wall 81 of the baffle plate cover section 65 pushes the rubber plate 76 downward as viewed in FIG. 8.

Particularly, as shown in FIG. 9, by placing the baffle plate cover section 65 over the chain cover section 63 while deforming the rubber plate 76 from the shape indicated by a virtual line to the shape indicated by a solid line in FIG. 9, the degree to which the rubber plate 76 and the cover bottom wall 76 are sealed is increased due to the elasticity of the rubber plate 76.

Therefore, a part of the driven sprocket 12 other than an upper right part thereof as viewed in FIG. 8, through which the chain 8 is passed, is enclosed by the chain cover section 63, separation wall 64, baffle plate cover section 65, and bottom wall plate 67.

FIG. 10 is a diagram schematically showing the arrangement of the baffle plate 60 in the case where the oil pump 10 and its vicinity are viewed from above in FIG. 1.

The case bottom wall 51 below the oil pump 10 (at the back as viewed in FIG. 10) is provided with a case hole 54 through which oil in the transmission case 50 flows into the oil pan.

An oil strainer 15 is provided below the case hole 54 (at the back as viewed in FIG. 10).

Other than in a space through which the chain 8 is passed (toward substantially the front side as viewed in FIG. 10), the driven sprocket 12 attached to the oil pump rotary shaft 11 of the oil pump 10 is enclosed by the chain cover section 63, baffle plate cover section 65, and case bottom wall 51. This prevents oil in the space enclosed by the chain cover section 63, baffle plate cover section 65, and the bottom wall plate 67 from flowing directly into the case hole 54.

Also, the oil pump 10 side of the final gear 5 is enclosed by the final gear cover section 62, and hence oil in the vicinity of the final gear 5 is stored once in the oil storage chamber 96 to flow into the case hole 54 through the oil discharge hole 98 without flowing directly to the case hole 54.

It should be noted that in the present embodiment, the baffle plate base section 61 constitutes a first baffle plate of the present invention, and the baffle plate cover section 65 constitutes a second baffle plate of the present invention. Also, the chain cover section 63 and the bottom wall plate 67 constitute a chain cover section of the present invention, and the rubber plate 76 constitutes an elastic member of the present invention.

According to the present embodiment arranged as described above, since the space around the oil strainer 15 and the space around the driven sprocket 12 as well as the final gear 5 are separated by the baffle plate base section 61, oil that contains air bubbles formed as a result of agitation by the driven sprocket 12, chain 8, and final gear 5 do not flow directly into the oil strainer 15. Therefore, the oil strainer 15 is unlikely to draw oil containing air bubbles.

Also, since the chain cover section 63 that separates the space around the driven sprocket 12 and the space around the oil strainer 15, and the final gear cover section 62 that separates the space around the final gear 5 and the oil strainer 15 are configured as an integral body, the driven sprocket 12 as well as the final gear 5 and the oil strainer 15 can be separated without increasing the number of parts.

Further, since the oil-immersed area of the driven sprocket 12 and the chain 8 is enclosed by the baffle plate base section 61 and the baffle plate cover section 65, the amount of oil agitated by the driven sprocket 12 and the chain 8 can be limited to reduce friction caused by agitation.

Further, since the baffle plate base section 61 is provided with the separation wall 64, the flows of oil caused by rotations of the driven sprocket 12 and the final gear 5 do not interfere with each other, and therefore, friction loss can be reduced to improve lubrication property. It should be noted that although in the above described embodiment, the separation wall 64 is formed on the baffle plate base section 61 side, the present invention is not limited to this, but if the separation wall 64 is formed on the baffle plate cover section 65 side, the same effects as those described above can be obtained.

The final gear cover section 62 is formed with the oil storage chamber 96, and part of oil flowing in the rotation direction of the final gear 5 is removed by the oil introducing plate 99, temporarily stored in the oil storage chamber 96, and then directed toward the case hole 54 through the oil discharge hole 98.

With this arrangement, even in the case where oil runs short in the oil strainer 15, oil can be supplied from the finagle gear 5 via the oil storage chamber 96 and the oil discharge hole 98, and therefore, the oil strainer 15 can be prevented from drawing air.

Also, since oil is temporarily stored in the oil storage chamber 96 and then flown into the case hole 54 through the oil discharge hole 98, air bubbles leave the oil in the oil storage chamber 96, so that the oil with reduced air bubbles can be flown into the case hole 54.

Further, since oil in the final gear cover section 62 (oil around the final gear 5) is discharged toward the case hole 54 through the oil discharge hole 98, the amount of oil agitated by the final gear 5 can be decreased to reduce friction loss of the final gear 5.

It should be noted that although in the above described embodiment, the oil storage chamber 96 is provided on the final gear 5 side, the present invention is not limited to this, but if the oil storage chamber 96 is provided on the driven sprocket 12 side, the same effects as those described above can be obtained.

Alternatively, if the rubber plate 76 is interposed between the bottom wall plate 67 attached to the chain cover section 63 and the baffle plate 65 to seal the lower side of the driven sprocket 12, oil containing air bubbles around the driven sprocket 12 can be surely prevented from flowing into the case hole 54.

Also, since the bottom wall plate 67 and the baffle plate cover section 65 are not in contact with each other, noise and vibrations caused by the contact can be suppressed.

Further, since the rubber plate 76 has elastic force, it is unnecessary to strictly manage the precision of (or the gap between) the bottom plate 67 and the baffle plate cover section 65.

What is claimed is:

1. An oil separating structure of an automatic transmission, comprising:
    a transmission case;
    an oil pump disposed in the vicinity of a case bottom of the case;
    a driven sprocket attached to an oil pump rotary shaft;
    an oil strainer for the oil pump disposed below the pump in the transmission case;
    a first baffle plate having a shaft hole for inserting the oil pump rotary shaft and disposed between the driven sprocket of the oil pump, at least part of which is disposed within oil, and the oil strainer, for separating a space around the driven sprocket and a space around the oil strainer;
    a second baffle plate disposed on an opposite side of said first baffle plate with respect to the driven sprocket, for separating a space around the driven sprocket and a space around a transmission case located on the opposite side of said first baffle plate with respect to the driven sprocket; and
    an elastomeric member provided at a junction of said first baffle plate and said second baffle plate;
    wherein the elastomeric member is attached to one of the first and second baffle plates and extends as a bent plate contacting the other of the first and second baffle plates so as to provide a seal between both of them; and
    wherein said first baffle plate, said second baffle plate, and said elastomeric member enclose at least an oil-immersed path of a chain extended over the driven sprocket.

2. An oil separating structure of an automatic transmission according to claim 1, wherein said first baffle plate comprises:
    a chain cover section disposed between the driven sprocket of the oil pump, at least part of which is disposed within oil, and the oil strainer, for separating the space around the driven sprocket and the space around the oil strainer; and
    a final gear cover section connected to said chain cover section and disposed between a final gear which is disposed in the transmission case, and at least part of which is disposed within oil, and the oil strainer, for separating a space around the final gear and the space around the oil strainer.

3. An oil separating structure of an automatic transmission according to claim 2, wherein said first baffle plate or said second baffle plate comprises a separation wall that separates the space around the final gear and the space around the driven sprocket.

4. An oil separating structure of an automatic transmission according to claim 2, wherein an oil discharge hole that connects the space around the driven sprocket or the space around the final gear to the space around the oil strainer is formed in a lower part of said first baffle plate.

5. An oil separating structure of an automatic transmission according to claim 3, wherein an oil discharge hole that connects the space around the driven sprocket or the space around the final gear to the space around the oil strainer is formed in a lower part of said first baffle plate.

* * * * *